(12) United States Patent
Andersen et al.

(10) Patent No.: US 9,657,862 B1
(45) Date of Patent: May 23, 2017

(54) PROTECTIVE COVER FOR VALVE

(71) Applicants: Trent Andersen, Fayetteville, AR (US); Kurt Kutz, Fayetteville, AR (US)

(72) Inventors: Trent Andersen, Fayetteville, AR (US); Kurt Kutz, Fayetteville, AR (US)

(73) Assignee: CAIRN5 LLC, Elkins, AR (US)

( * ) Notice: Subject to any disclaimer, the term of this patent is extended or adjusted under 35 U.S.C. 154(b) by 0 days.

(21) Appl. No.: 13/750,529

(22) Filed: Jan. 25, 2013

Related U.S. Application Data

(60) Provisional application No. 61/591,654, filed on Jan. 27, 2012.

(51) Int. Cl.
*F16K 5/22* (2006.01)
*F16K 27/12* (2006.01)
*F16K 31/50* (2006.01)

(52) U.S. Cl.
CPC .............. *F16K 27/12* (2013.01); *F16K 5/22* (2013.01); *F16K 31/50* (2013.01)

(58) Field of Classification Search
CPC .......... F16K 5/222; F16K 5/225; F16K 5/227; F16K 5/22; F16K 31/50
USPC .................. 251/355, 264–278; 137/385, 382
See application file for complete search history.

(56) References Cited

U.S. PATENT DOCUMENTS

| | | | | |
|---|---|---|---|---|
| 614,157 A | * | 11/1898 | Wormald | 70/179 |
| 1,468,747 A | * | 9/1923 | Shoultz | 251/355 |
| 1,569,252 A | * | 1/1926 | Barnes | 137/246.13 |
| 3,199,876 A | * | 8/1965 | Magos et al. | 277/500 |
| 4,374,583 A | * | 2/1983 | Barrington | 251/324 |
| 4,779,647 A | * | 10/1988 | Christian | 137/625.37 |

* cited by examiner

*Primary Examiner* — Kevin Murphy
(74) *Attorney, Agent, or Firm* — Polsinelli PC

(57) ABSTRACT

A metering device with a protective sleeve or cover is described. The metering device adjusts a flow of a fluid. The metering device includes a valve, a neck, and a stem. The neck includes an opening to receive the stem in a rotational engagement. The stem is engaged to the valve to adjust the valve. The sleeve or cover encloses or covers the opening. The sleeve includes a first opening and a second opening. The first opening attaches to the neck. A knob inserts through the second opening of the sleeve. The knob attaches to the stem, and rotating the knob adjusts the valve.

25 Claims, 4 Drawing Sheets

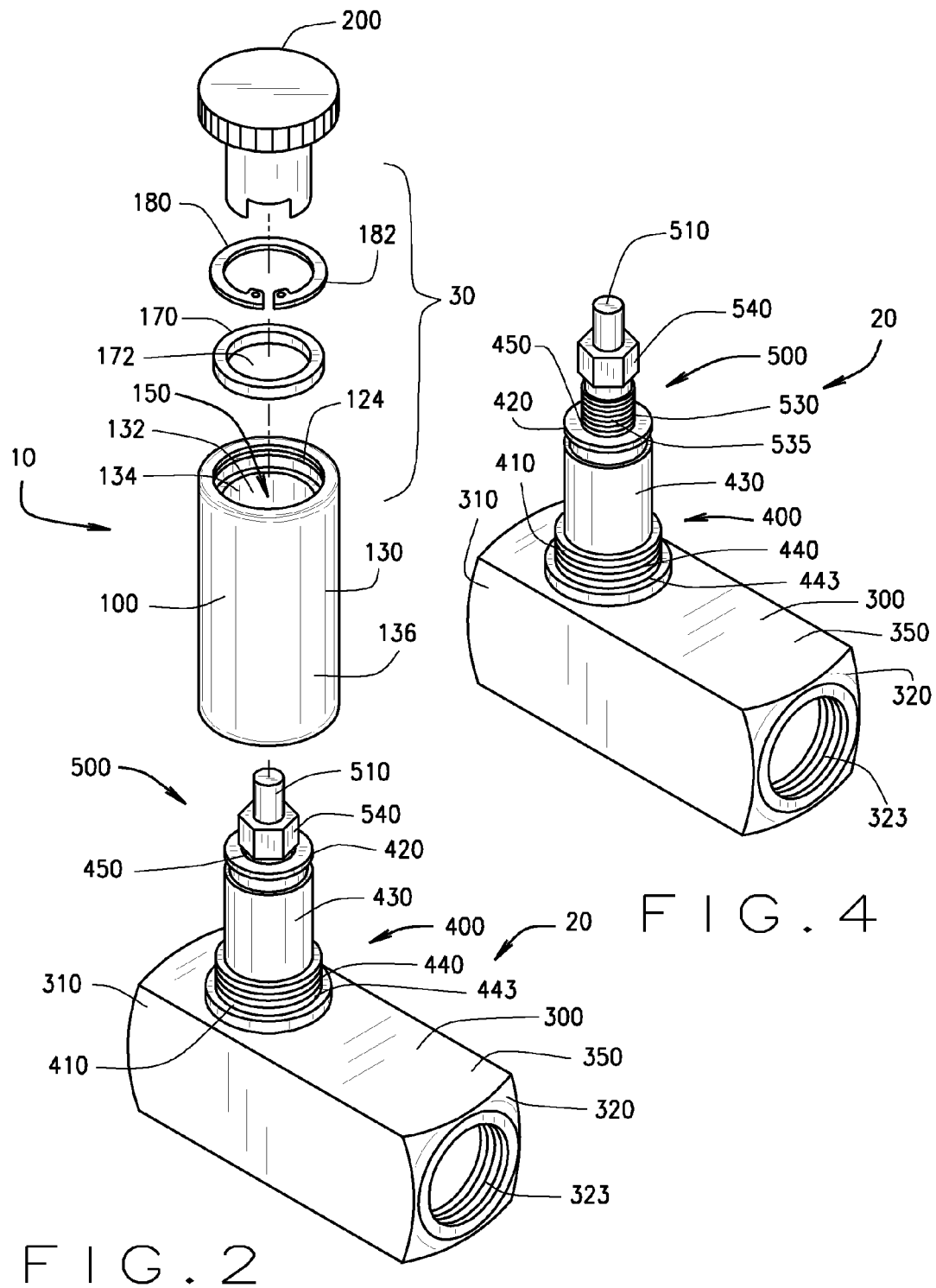

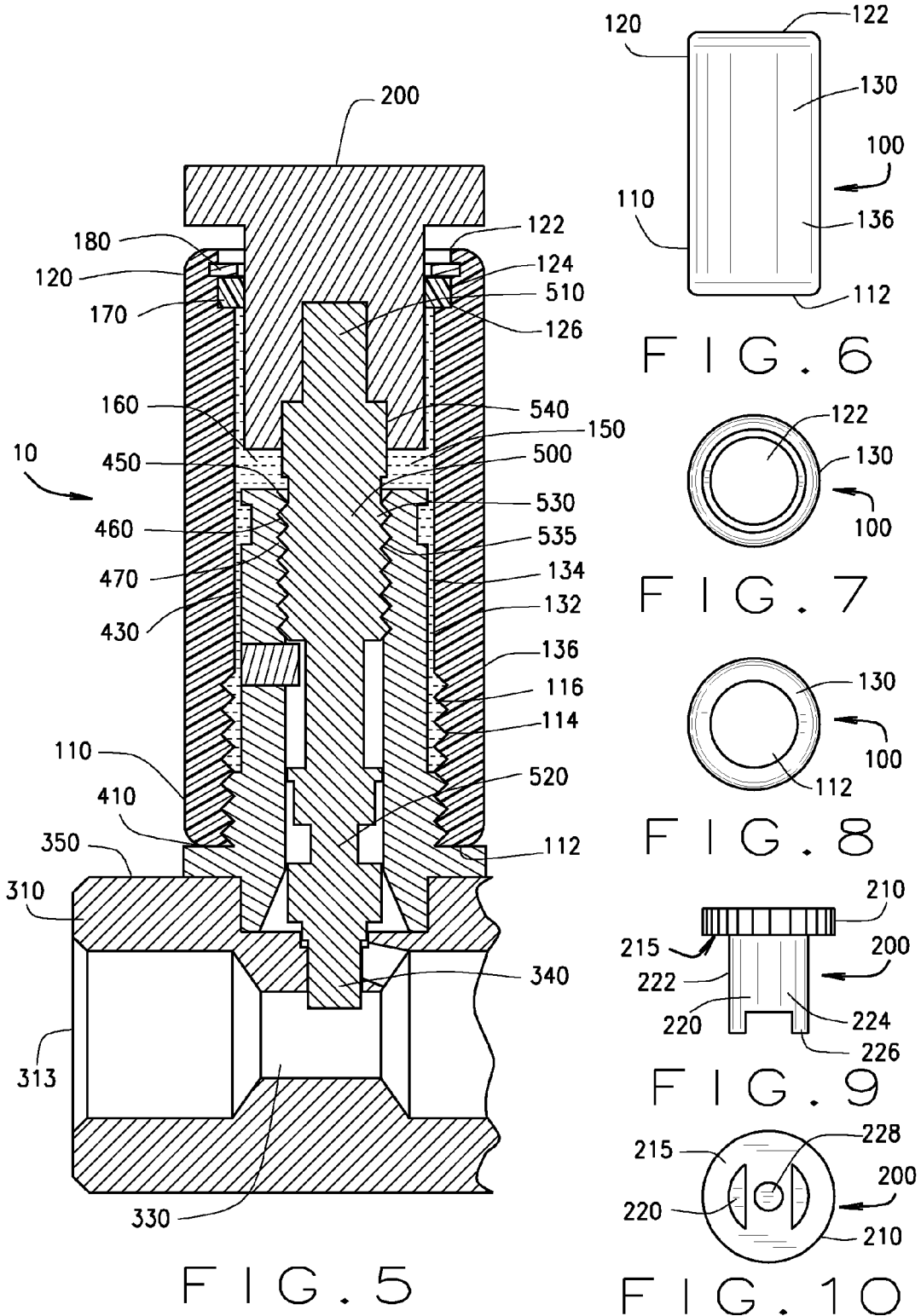

PROTECTIVE COVER FOR VALVE

CROSS REFERENCE TO RELATED APPLICATION

This application is a Nonprovisional of Provisional Patent Application No. 61/591,654 filed Jan. 27, 2012, which is hereby incorporated by reference in its entirety.

FIELD OF THE INVENTION

A sleeve assembly is herein described that attaches or mounts to a metering device. The sleeve assembly provides a protective cover for the metering device.

BACKGROUND OF THE INVENTION

In many industrial food-processing operations, metering devices, such as valves, are routinely washed down with water and other cleaning solutions to maintain clean and sanitized equipment and surrounding environment. This routine wash-down may encourage or promote particulate matter or other contaminants to interfere with operational components of the metering device. The routine wash-down may involve high pressure sprays that drive or urge the particulate matter and contaminants into the metering device. Such particulate matter and contaminants may damage the metering device, cause the metering device to fail, or result in premature wear to the metering device.

SUMMARY OF THE INVENTION

A sleeve assembly is herein described that attaches or mounts to a metering device. The sleeve assembly provides a protective cover for the metering device. The sleeve assembly reduces exposure of at least some of the operational components of the metering device to contaminants, moisture, and/or particulate. The sleeve assembly covers some of the operational components of the metering device. As such, the sleeve assembly may reduce corrosion of the metering device and extend the operational life of the metering device.

The metering device may include a stem portion that engages a neck portion. The stem portion and the neck portion each include engagement surfaces that may be damaged by the build-up of particulate or contaminates. The sleeve assembly or cover reduces contamination of the metering device by covering at least a portion of these operational components of the metering device. The sleeve assembly or cover attaches or mounts to the metering device and still permits normal operation of the metering device. The metering device may still be adjusted by turning or manipulating a knob that is engaged to the stem portion. The knob passes or inserts into the sleeve assembly or cover.

The sleeve assembly may be used in caustic, corrosive, or otherwise contaminated environments to reduce or prevent chemical or particulate matter from contacting the operational components of the metering device assembly. For example, the sleeve assembly is well-suited for use in commercial food production and packaging facilities. The sleeve assembly helps to prevent or reduce the likelihood of breading, grease, moisture, contaminants, and/or other particulate matter from damaging the metering device. Without the sleeve assembly, certain operational components of the metering device are exposed to the contaminates and particulate, which may cause the metering device to fail.

The sleeve assembly may be used with any variety of metering devices, such as needle valves, flow controls, pressure compensated flow controls, and other valves. The sleeve assembly may also be used with other valves that are used in corrosive or other environments that are subject to weathering. For example, the sleeve assembly may be used to prevent moisture from rainwater or from the atmosphere from entering into a metering device in an outdoor environment and causing damage through freezing.

In one aspect, a metering device is described. The metering device adjusts a flow of fluid through the metering device. The metering device includes a valve, a neck, and a stem. The neck includes an opening to receive the stem in a rotational engagement. The stem is further engaged to the valve to adjust the valve. A sleeve or cover encloses the opening. The sleeve or cover includes a first sleeve opening and a second sleeve opening. The first sleeve opening mounts or attaches to the neck. A knob inserts through the second sleeve opening. The knob attaches to the stem. Rotating the knob adjusts the valve to adjust the flow of the fluid through the metering device.

The sleeve or cover may be filled with grease or other protective lubricants. The sleeve or cover encloses the opening where the stem engages to the neck. The sleeve maintains an amount of the grease in contact with the opening, a portion of the neck, and/or a portion of the stem. The stem may include a threaded surface that engages the neck. This threaded surface of the stem should be maintained in a clean state, otherwise, corrosion and contaminates may build-up on the threaded surface resulting in failure of the stem, e.g., the stem can no longer be rotated relative to the neck. The sleeve covers the threaded surface. The sleeve packs the grease about this threaded surface of the stem to keep it free from contaminants. As such, the use of the sleeve assembly increases the operational life of the metering device.

In another aspect, a sleeve assembly to protect a valve stem is described. The sleeve assembly includes a container having a first end and a second end. The first end defines a first opening. The second end defines a second opening. The container defines a cavity to maintain an amount of grease. The knob includes a connecting portion and a gripping portion. The connecting portion inserts through the second opening.

In another aspect, a method of making a metering device is described. The method includes providing a metering device to adjust a flow of a fluid through the device. The metering device includes a valve, a neck, and a stem. The neck includes an opening to receive the stem in a rotational engagement, and the stem is engaged to the valve to adjust the valve. The method includes providing a sleeve to enclose or cover the opening. The sleeve includes a first opening and a second opening. The method includes attaching the first opening of the sleeve to the neck. The method includes filling the sleeve with an amount of grease. The method includes providing a knob having a connection portion. The method includes inserting the connection portion of the knob through the second opening of the sleeve. The method includes attaching the connection portion to the stem.

In another aspect, a method of using a metering device is described. The method includes providing a metering device to adjust a flow of a fluid through the device. The metering device comprises a valve, a neck, and a stem. The neck comprises an opening to receive the stem in a rotational engagement, and the stem is engaged to the valve to adjust the valve. The method includes providing a sleeve to enclose the opening, the sleeve comprising a first opening and a second opening. The method includes attaching the first opening of the sleeve to the neck. The method includes filling the sleeve with an amount of grease. The method includes providing a knob having a connection portion and a gripping portion. The method includes inserting the connection portion of the knob through the second opening of the sleeve. The method includes attaching the connection portion to the stem. The method includes rotating the gripping portion to adjust the metering device.

In another aspect, a tamper resistant sleeve assembly is described. The tamper resistant sleeve assembly includes a cover or a plug that fits over or into an opening of a sleeve or a container. The cover or plug fastens to the sleeve or the container. The sleeve or container also attaches or mounts to a metering device. The sleeve/container and the cover/plug conceal a valve and/or a valve stem of the metering device in order to prevent unauthorized adjustment of the valve and the valve stem.

In another aspect, a tamper resistant sleeve assembly to protect a valve is described. The sleeve assembly includes a sleeve having a first end and a second end. The first end defines a first opening. The second end defines a second opening. A wall joins the first end and the second end. A hole is in the wall near the second opening. A cover attaches to the sleeve. The cover includes an upper portion and a lower portion. The lower portion inserts into the second opening of the sleeve. A fastener passes through the hole in the wall and engages a hole in the lower portion.

In another aspect, a method of making a metering device tamper resistant is described. The method includes providing a metering device, which includes a valve, a neck, and a stem. The neck includes a neck opening to receive the stem in a rotational engagement. The stem is engaged to the valve to adjust the valve. The method includes providing a sleeve to enclose the neck opening. The sleeve includes a first opening and a second opening. The method includes attaching the first opening of the sleeve to the neck. The method includes providing a cover having an upper portion and a lower portion. The method includes inserting the lower portion of the cover through the second opening of the sleeve. The method includes fastening the cover to the sleeve. The method includes filling the sleeve with an amount of grease. The method includes passing a fastener through a hole in the wall of the sleeve and into a hole in the lower portion. The method includes aligning the hole in the wall of the sleeve with the hole in the lower portion by aligning the hole in the wall of the sleeve with a fixture point on the upper portion, wherein the fixture point on the upper portion is above the hole in the lower portion.

BRIEF DESCRIPTION OF DRAWINGS

FIG. 2 is an exploded view of the metering device assembly.

FIG. 4 is a perspective view of the metering device.

FIG. 5 is cross-sectional view of the metering device assembly.

FIG. 6 is a front view of the sleeve.

FIG. 7 is a top view of the sleeve.

FIG. 8 is a bottom view of the sleeve.

FIG. 9 is a side view of the knob.

FIG. 10 is a bottom view of the knob.

DETAILED DESCRIPTION OF THE INVENTION

Figure 1:
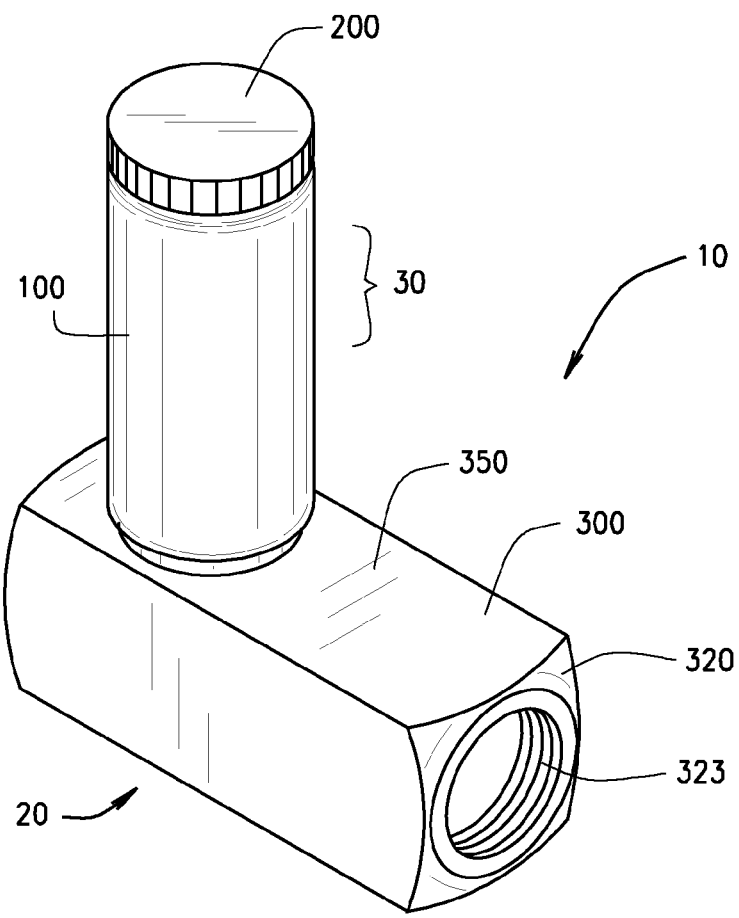
FIG. 1 is a perspective view of the metering device assembly.
Figure 3:
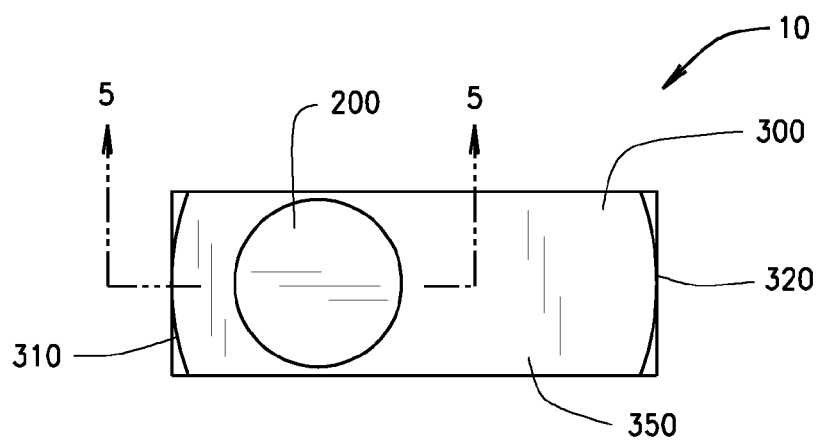
FIG. 3 is a top view of the metering device assembly.

A metering device assembly 10 will now be described with reference to FIGS. 1-10. The metering device assembly 10 includes a metering device 20 and a sleeve assembly 30. The sleeve assembly 30 mounts or attaches to the metering device 20 to protect the metering device 20 from contamination.

The sleeve assembly 30 includes a sleeve 100. An exploded view of the sleeve assembly 30 is shown in FIG. 2. The sleeve 100 includes a first end 110 that is generally opposite of a second end 120. The sleeve 100 may include a generally cylindrical shape in between the first end 110 and the second end 110. Walls 130 join the first end 110 and the second 120. Although a generally cylindrical shape is shown in the FIGS., the sleeve 100 may include other shapes such as a squared, polygonal, or irregular cross-section. The sleeve 100 may include a cover, jacket, or other protective structure.

With respect to FIG. 5, the walls 130 include an inner surface 132 and an outer surface 136. The inner surface 132 defines a cavity 150 that may be packed or partially filled with a grease 160 or other protective lubricant. The sleeve 100 may include an inner diameter 134 that surrounds components of the metering device 20. The first end 110 includes a first opening 112. The first opening 112 is adjacent inner threading 116 on an inner diameter 114 of the inner surface 132. In this aspect, the inner threading 116 threadably engages to the metering device 20.

The second opening 122 includes an adjacent groove 124 in the inner surface 132. The groove 124 has an inner diameter 126 that is greater than the inner diameter 134. The groove 124 receives a seal 170 and a snap-ring 180, which are used to maintain the grease 160 in the cavity 150 of the sleeve 100. The snap-ring 180 includes an exterior surface 182 that seals against the inner diameter 126 of the groove 124. The snap-ring 180 may be compressed during installation such that the snap-ring 180 biases against the inner diameter 126.

With reference to FIGS. 9 and 10, a knob 200 is used to adjust the metering device 20. The knob 200 may includes any of a variety of handle shapes or configurations. The knob 200 includes a gripping portion 210 and a connecting portion 220. The gripping portion 210 is the surface that a user grasps to adjust the knob 200 and the metering device 20. The connecting portion 220 extends from a lower surface 215 of the gripping portion 210. The connecting portion 220 attaches or connects to the stem pilot end 510 of the stem 500. As shown in FIG. 5, the connecting portion 220 of the knob 200 passes through the second sleeve opening 122 and attaches or connects to the stem pilot end 510 via friction, adhesive, threading, etc. In other aspects, the knob 200 may include a handle or lever shape, which may rotate in ranges of or less than or more than 360 degrees relative to an axis of the metering device 20. For example, a lever engaged to a metering device via the sleeve 100 may rotate in a range of up to 45 degrees or 90 degrees.

The connecting portion 220 includes an attachment portion 226, such as the opening 228 which fits the stem pilot end 510. The connecting portion 220 further includes an exterior surface 222 with an outer diameter 224 that is just less than the inner diameter 134 of the sleeve 100. As such, the knob 200 includes a portion or component that inserts into the sleeve 100 to engage a portion of the stem 500. As shown in FIG. 2, the connecting portion 220 inserts through the second sleeve opening 122 and through a central opening 172 of the seal 170.

The metering device 20 will now be described with reference to FIG. 4. The body 300 of the metering device 20 includes a first end 310 opposite of a second end 320. The first end 310 includes an input port 313 that receives fluid for the metering device 20. The input port 313 is in fluidic communication with a fluidic passage 330 and the valve 340. The valve 340 controls the flow of the fluid though the fluidic passage 330 of the metering device 20. The second end 320 includes an output port 323 that outputs the fluid from the metering device 20. When the metering device 20 is actuated, the valve 340 opens or constricts the fluidic passage 330.

The metering device 20 further includes an upper surface 350. The neck 400 of the metering device 20 extends from the upper surface 350 of the metering device 20. The neck 400 includes a first end 410 adjacent the upper surface 350. The neck 400 further includes a second end 420 opposite of the first end 410. The neck 400 has an outer diameter 430 that forms a sealing surface 440 for the neck 400. The sealing surface 440 receives or engages to the first sleeve opening 112.

In this aspect, the sealing surface 440 includes a threaded outer diameter 443 that threadably engages the inner threading 116 of the first sleeve opening 112. In other aspects, the sealing surface 440 may include any of a variety of mechanical connections to engage or mount the sleeve 100 to the neck 400. For example, an annual ring or edge may be provided on the sealing surface 440, and the first sleeve opening 112 may snap-fit or frictionally engage said annular ring or edge. In other aspects, the first sleeve opening 112 may include a snap-ring/seal combination that mounts to the sealing surface 440.

The second end 420 of the neck 400 further includes an opening 450. The opening 450 receives the stem 500 in a rotational engagement. As shown in FIG. 5, the opening 450 has a threaded inner diameter 460 that forms a female mating surface 470.

The stem 500 includes the stem pilot end 510 and the valve end 520. The stem 500 includes a male mating surface 530 having a threaded outer diameter 535. The threaded inner diameter 460 of the opening 450 receives the threaded outer diameter 535 of the male mating surface 530 to provide for the rotational engagement between the stem 500 and the neck 400. The stem 500 may further include a hex surface 540 that provides a mechanical connection to the attachment portion 226 of the connecting portion 220.

Without the sleeve assembly 30, the male mating surface 530 of the stem 500 is prone to contamination and deterioration as it is generally open to the environment. Further, this male mating surface 530 needs to be maintained in a generally clean state, otherwise contaminates or corrosion may build up on the threaded outer diameter 535 causing the stem 500 to not be rotatable relative to the neck 400. As the stem 500 is rotated, the male mating surface 530 may enter the female mating surface 470. Likewise, as the stem 500 is loosened, as shown in FIG. 4, more of the male mating surface 530 may be exposed as it withdraws from the threaded inner diameter 460. As such, it is important to maintain the male mating surface 530 and the threaded outer diameter 535 relatively clean and free of debris or contaminates to maintain the desired rotational operation of the stem 500 relative to the neck 400.

Also, the grease 160 contained by the sleeve 100, as shown in FIG. 5, is maintained on the opening 450 where the male mating surface 530 engages the female mating surface 470. The sleeve 100 covers the opening 450. The cavity 150 of the sleeve 100 holds the grease 160 about the engagement between the male mating surface 530 and the female mating surface 470 at the opening 450. Importantly, by also covering the opening 450 with an amount of grease, debris and contaminants are less likely to enter into the threaded internal diameter 470 of the neck 400.

The sleeve 100 attaches or mounts to the metering device 20 and still permits normal operation of the metering device 20. The metering device 200 may be still be adjusted by turning or manipulating the knob 200 that is engaged to the stem 500. The knob 200 passes or inserts into the sleeve 100 into mechanical communication with the valve 340. As such, the valve 340 of the metering device 20 may still be opened or closed with the sleeve 100 in a fully installed positioned, i.e., the knob 200 may be rotated clockwise or counter-clockwise while the sleeve 100 is covering portions of the stem 500, the neck 400, and/or the opening 450.

Also, the sleeve 100 maintains an amount of the grease 160 on the male mating surface 530 that is not engaged to the female mating surface 470, such that this not engaged male mating surface 530 may remain clean and free of debris or corrosion. The combination of the sleeve 100 and the grease 160 protects the stem 500 from contaminants. The sleeve 100 and the grease 160 isolates the stem 500 from contaminants. The seal 170 may include any of a variety of commercially available lip or oil seals, such as a buna seal.

The sleeve 100 may be made from any of a variety of plastics such as thermoplastics, polyacetal, or other suitable materials. In one aspect, the sleeve 100 may be formed from a DELRIN plastic material. The sleeve 100 has a generally oblong shape in order to cover the engagement of the neck 400 and the stem 500. The sleeve 100 may have a length of approximately 1 inch to approximately 6 inches, depending upon the application, the metering device 20, etc. The sleeve 100 may have a length of approximately 2½ inches. One of ordinary skill in the art may scale the sleeve 100 up or down to suit their intended application.

The sleeve 100 has a generally hollow interior within its internal diameter 134 that forms the cavity 150. The cavity 150 and the internal diameter 134 should be large enough to cover or partially cover the operational components of the metering device 120 with an amount of the grease 160. The internal diameter 134 may range from approximately ⅓ inch to approximately 3 inches, depending upon the metering device 20, its specific neck 400, and stem 500. One of ordinary skill in the art may scale the internal diameter 134 up or down to suit their intended application.

The sleeve 100 should be filled with enough of the grease 160 to cover the operational components of the metering device 20. The cavity 150 of the sleeve 100 may be fully filled or partially filled with the grease 160 in order to at least cover the male mating surface 530.

The metering device 200 may pass any of a variety of hydraulic fluids, such as water glycol, or other fluids commonly used in industrial applications. The metering device 200 may include, for example, a flow control valve commercially available from HYDAC of Glendale Heights, Ill. under the SRVR series of pressure compensated flow control valve. These flow control valves range in size from ¼ inch to ¾ inch and provide up to 24 gallons per minute of flow. These flow control valves may include an internal check valve.

The seal 170 is made from any of a variety of elastomeric materials or other compressible materials suitable for use in a food-safe environment. The seal 170 may be a commercially available oil seal from SKF of Elgin, Ill. The grease 160 may include any of a variety of commercially available, food grade greases or oils, such as FG1 grease. In other non-food applications, the grease 160 may include any type of grease or oil.

Figure 11:
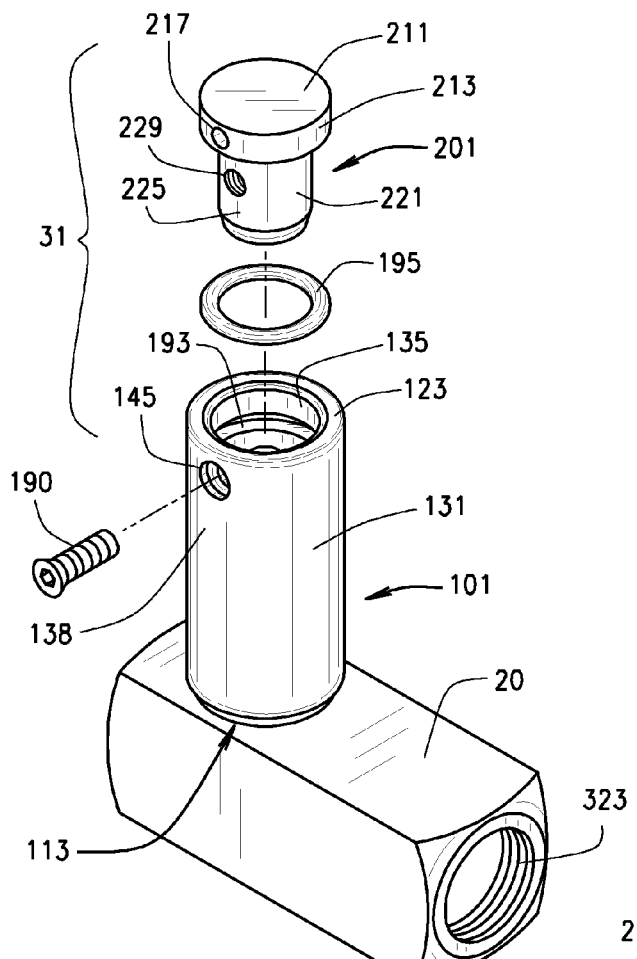
FIG. 11 is an exploded view of the tamper resistant sleeve assembly.
Figure 12:
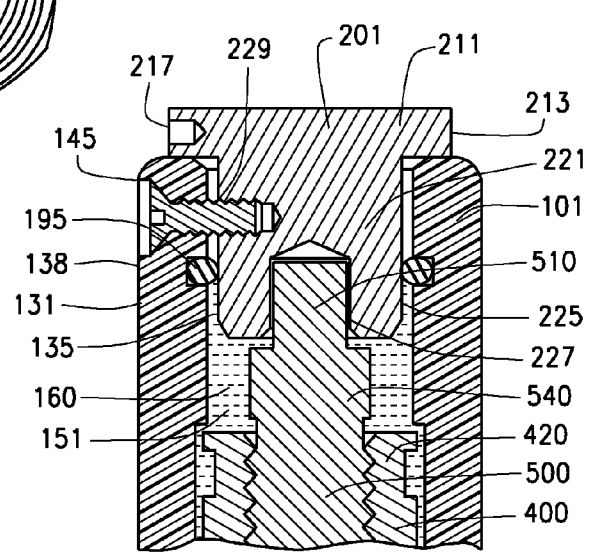
FIG. 12 is a sectional view of the tamper resistant sleeve assembly.

In another aspect, a sleeve 101 and a cover 201 are shown in FIGS. 11-12. The sleeve 101 and the cover 201 provide a tamper resistant sleeve assembly 31 to engage the metering device 20. The cover 201 provides a plug or closure for the sleeve 101. The cover 201 reduces tampering with the valve stem 500 of the metering device 20.

The cover 201 fits a second sleeve opening 123 of the sleeve 101. The tamper resistant sleeve assembly 31 provides the same protective and anti-corrosive benefits of the sleeve assembly 30; however, the tamper resistant qualities of the tamper resistant sleeve assembly 31 reduce the likelihood of an unauthorized user adjusting the flow rate of the metering device 20. The tamper resistant sleeve assembly 31 may be used with the metering device 20 previously described herein and any of the other valves described herein.

The sleeve 101 may engage the metering device 20 in the same manner as the sleeve 100, and, except where noted, the sleeve 101 generally has the same structure and function as the sleeve 100. The sleeve 101 includes a first sleeve opening 113 and the second sleeve opening 123 joined by a wall 131. The sleeve 101 further includes a hole 145 in its wall 131. The hole 145 is positioned in the wall 131 near or towards the second sleeve opening 123. The hole 145 passes clear through the wall 131.

The cover 201 includes an upper portion 211 and a lower portion 221. When the cover 201 is installed on the sleeve 101, the lower portion 221 enters the inside of the second sleeve opening 123. The lower portion 221 has an external diameter 225 just smaller than an inner diameter 135 of the sleeve 101 such that the lower portion 221 fits into the second sleeve opening 123. The external diameter 225 of the lower portion 221 is generally smaller than the upper portion 211.

A fastener 190 passes through the hole 145 in the wall 131 and threadably engages a hole 229 in the lower portion 221 of the cover 201. By inserting the fastener 190 through the hole 145 and into the hole 229, the cover 201 is fastened to the sleeve 101. Absent removing the fastener 190 or destructive measures, the cover 201 may then generally not be removed from the sleeve 101. The combination of the sleeve 101 and the cover 201 prevent access to the valve stem 500.

The hole 145 may have a countersink design to permit the fastener 190 to be tightened flush with an outer surface 138 of the sleeve 101. This makes the fastener 190 more difficult to remove, since there is no gripping surface on the fastener 190 for pliers or the like.

The fastener 190 may include a variety of mechanical fasteners such as screws, bolts, rivets, etc. The hole 229 may have a threaded internal diameter to receive the fastener 190. One suitable fastener is a machine screw with a tamper resistant pin-in-star drive from MCMASTER-CARR of Atlanta, Ga. A specialized tool with a unique and complementary shape for the pin-in-star is used to loosen or tighten this type of fastener. Other specialized fasteners and tools may be used for and with the fastener 190 to reduce the ability for the unauthorized user to remove the fastener 190.

The upper portion 211 of the cover 201 may have an external diameter approximately equal to or smaller than an external diameter of the sleeve 101. Also, the cover 201 includes the upper portion 211 with an outer perimeter 213 both having generally smooth surfaces. The combination of the smooth outer surfaces of the upper portion 211 and the outer perimeter 213 and the reduced outer diameter reduce the likelihood and/or ability of an unauthorized user to remove or pull the cover 201 from the sleeve 101.

The sleeve 101 includes an annular groove 193 in the inner diameter 135 of the sleeve 101. The annular groove 193 receives an O-ring 195. The O-ring 195 seals against the external diameter 225 of the lower portion 221 to maintain the grease 160 in a cavity 151 of the sleeve 101.

In the aspect of FIGS. 11-12, the lower portion 221 of the cover 201 is not mechanically engaged to the hex surface 540 or the stem pilot end 510 of the stem 500 to provide for the adjustment of the valve 340. Instead, an opening 227 of the lower portion 221 may fit loosely over the stem pilot end 510 or have no contact with the stem pilot end 510. Prior to installing the sleeve 101 and the cover 201, the valve 340 is adjusted to a desired operating level. Once the sleeve 101 and the cover 201 are installed on the metering device 20, the valve 340 cannot generally be adjusted without removing the sleeve 101 and the cover 201.

The outer perimeter 213 of the upper portion 211 may include a fixture point 217, such as an opening, notch, groove, etc. The fixture point 217 provides a point for the user to engage to the outer perimeter 213 with a tool, pry, or the like, which allows the user to remove the cover 201 from the sleeve 101. As the lower portion 221 passes through the O-ring 195 into the sleeve 101, the cover 201 is difficult to remove without the use of the tool even after the fastener 190 is removed. As shown in FIG. 11, the fixture point 217 includes a circular opening into which an end of the tool may be inserted.

Additionally, the fixture point 217 may be aligned in the same vertical plane as the hole 229. Said another way, the fixture point 217 is directly above the hole 229. This vertical alignment between the fixture point 217 and the hole 229 eases installation of the fastener 190 into the hole 229. When the lower portion 221 is inserted into the second sleeve opening 123, the hole 229 is generally no longer visible. By rotating the cover 201 until the fixture point 217 is aligned with the hole 145 in the sleeve 101, the user will have aligned the hole 145 in the sleeve 101 with the hole 229 in the lower portion 221, and the fastener 190 may be threaded into the hole 229.

In other aspects, the fixture point 217 may be omitted and/or replaced with a guide line, reference mark, or other indication that is engraved, stamped, printed, etc, into the upper portion 211 to assist in alignment between the hole 145 and the hole 229.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed is:

1. A metering device assembly, comprising:
   a metering device to adjust a flow of a fluid through the device, the metering device comprising, a valve, a neck, and a stem, wherein the neck comprises an opening to receive the stem in a rotational engagement, and the stem is engaged to the valve to open and close the valve;

a sleeve to cover the opening, and the engagement of the stem to the opening, the sleeve comprising a first opening and a second opening, wherein the first opening attaches to the neck;

a seal member comprising a central opening, wherein the seal member is positioned against an inner diameter of the sleeve adjacent to the second opening;

and, a knob, wherein the knob comprises a connecting portion and a gripping portion, the connecting portion comprises an attachment portion, wherein the connecting portion and the attachment portion of the knob insert through the second opening of the sleeve and the central opening of the seal member, the attachment portion of the connecting portion of the knob attaches to the stem, and wherein rotating the knob opens and closes the valve to meter the flow of fluid through the valve.

2. The metering device assembly according to claim 1, wherein the connecting portion and the attachment portion are sized to insert through the second opening of the sleeve.

3. The metering device assembly according to claim 1, wherein the sleeve has a generally cylindrical shape, and the second opening is opposite of the first opening attached to the neck, and the knob inserts from an exterior of the metering device assembly through the second opening of the sleeve and the central opening of the seal member.

4. The metering device assembly according to claim 1, wherein the sleeve mounts to a sealing surface of the neck.

5. The metering device assembly according to claim 1, wherein the sleeve contains an amount of grease in contact with a portion of the neck and a portion of the stem.

6. The metering device assembly according to claim 1, wherein the first opening of the sleeve comprises a threaded inner diameter, wherein a sealing surface of the neck comprises a threaded outer diameter, wherein the threaded inner diameter threadably engages the threaded outer diameter to mount the sleeve on the neck.

7. The metering device assembly according to claim 1, wherein the stem comprises a male mating surface, wherein the neck comprises a female mating surface, and the male mating surface engages with the female mating surface.

8. The metering device assembly according to claim 1, wherein the stem comprises a male mating surface, wherein the neck comprises a female mating surface, wherein the male mating surfaces engages the female mating surface at the opening, wherein the sleeve contains an amount of grease in contact with the female mating surface, the male mating surface, and the opening.

9. The metering device assembly according to claim 1, wherein the neck extends from a body of the metering device, wherein the neck comprises an opening, wherein the opening has a threaded inner diameter, wherein the stem comprises a threaded engagement surface that threadably engages the threaded inner diameter of the opening.

10. The metering device assembly according to claim 9, wherein the sleeve contains an amount of grease in contact with the opening of the neck and the threaded engagement surface of the stem.

11. The metering device assembly according to claim 1, wherein the knob comprises the gripping portion and the connecting portion, wherein the connecting portion and the attachment portion insert through the second opening of the sleeve and connect to the stem, wherein the connecting portion and the attachment portion have an outer diameter smaller than an inner diameter of the sleeve and an inner diameter of the second opening.

12. The metering device assembly according to claim 1, wherein the seal member and a snap ring are positioned in the sleeve to contain grease in a cavity of the sleeve.

13. The metering device assembly according to claim 12, wherein the connecting portion and the attachment portion pass through a central opening of the seal member, and the seal member generally closes the second opening.

14. The metering device assembly according to claim 1, wherein the stem has a valve end and a stem pilot end, wherein the attachment portion of the connecting portion of the knob pass through the second opening of the sleeve and attaches or connects to the stem pilot end.

15. The metering device assembly according to claim 1, wherein the connecting portion and the attachment portion have exterior surfaces with diameters less than the inner diameter of the sleeve and an inner diameter of the second opening.

16. The metering device assembly according to claim 1, wherein the sleeve protects the stem from contaminants.

17. The metering device assembly according to claim 1, wherein the sleeve contains an amount of grease, and the sleeve and the grease isolate the stem from contaminants.

18. The metering device assembly according to claim 1, wherein the metering device is a needle valve, a flow control, a pressure compensated flow control, or other valve.

19. The metering device assembly according to claim 1, wherein a fastener passes through a hole in the sleeve and into the knob.

20. The metering device assembly according to claim 1, wherein the knob is fastened to the sleeve.

21. The metering device assembly according to claim 1, wherein the seal member is made from an elastomeric or compressible material.

22. A metering device assembly, comprising:
a metering device to adjust a flow of a fluid through the device, the metering device comprising, a valve, a neck, and a stem, wherein the neck comprises an opening to receive the stem in a rotational engagement, and the stem is engaged to the valve to open and close the valve;
a sleeve to cover the opening and the engagement of the stem to the opening, the sleeve comprising a first opening and a second opening, wherein the first opening attaches to the neck;
a knob, wherein the knob comprises a connecting portion, the connecting portion includes an attachment portion, wherein the connecting portion has an exterior surface with a diameter less than an inner diameter of the sleeve and an inner diameter of the second opening; wherein the connecting portion and the attachment portion insert through the second opening of the sleeve, the attachment portion of the connecting portion attaches to the stem, and wherein rotating the knob opens and closes the valve to meter the flow of fluid through the valve; and a seal and a snap ring are positioned in the sleeve to contain grease in a cavity of the sleeve, wherein the connecting portion and the attachment portion pass through a central opening of the seal; and,
wherein the sleeve comprises a groove having an inner diameter greater than the inner diameter of the sleeve, wherein the seal and the snap ring seat in the groove.

23. A metering device assembly, comprising:
a metering device to adjust a flow of a fluid through the device, the metering device comprising an input port to receive the fluid, a fluid passage, an output port to output the fluid, a valve, a neck, and a threaded stem, wherein the neck comprises a threaded opening to engage the threaded stem in a rotational and threaded engagement, and the threaded stem is engaged to the valve;

a sleeve to enclose the threaded opening and the engagement of the threaded stem to the threaded opening, the sleeve comprising a first opening, a second opening, and a groove in an inner diameter of the sleeve adjacent to the second opening, wherein the first opening attaches to the neck; the sleeve defining a cavity to hold an amount of grease, wherein the sleeve maintains the amount of grease on the threaded stem and the threaded opening of the neck;

a knob to adjust the flow of the fluid through the metering device, wherein the knob comprises a connecting portion having an attachment portion that inserts through the second opening of the sleeve, and the attachment portion attaches to the threaded stem; and, a seal member to generally close the second opening, the seal member positioned in the groove, and wherein the connecting portion of the knob passes through the seal member.

24. A sleeve assembly to protect a valve stem, comprising:

a container having a first end and a second end;

a wall of the container joins the first end and the second end;

the first end defining a first opening;

the second end defining a second opening;

the container comprising a groove having an inner diameter greater than an inner diameter of the wall of the container, wherein the groove is in the wall adjacent to the second opening, wherein a seal and a snap ring seat in the groove;

the container defining a cavity to maintain an amount of grease;

a knob comprising a connecting portion and a gripping portion, the connecting portion includes an attachment portion, the connecting portion and the attachment portion are sized to insert through the second opening of the container, and the connecting portion and the attachment portion insert through the second opening; and, the seal to generally close the second opening, and wherein the connecting portion and the attachment portion of the knob pass through the seal.

25. A method of using a metering device, comprising:

providing a metering device to adjust a flow of a fluid through the device, the metering device comprising, a valve, a neck, and a stem, wherein the neck comprises a neck opening to receive the stem in a threaded engagement, and the stem is engaged to the valve to adjust the valve;

providing a sleeve to cover the neck opening, and the engagement of the stem to the opening, the sleeve comprising a first opening and a second opening;

positioning a seal member against an inner diameter of the sleeve adjacent to the second opening;

attaching the first opening of the sleeve to the neck;

filling the sleeve with an amount of grease;

providing a knob having a connecting portion and a gripping portion, the connecting portion includes an attachment portion, wherein the connecting portion has an outer diameter smaller than an inner diameter of the sleeve and the second opening of the sleeve;

inserting the connecting portion and the attachment portion of the knob through the second opening of the sleeve;

attaching the attachment portion to the stem; and, rotating the gripping portion to adjust the metering device.

* * * * *